(12) United States Patent
Frigo et al.

(10) Patent No.: US 6,445,485 B1
(45) Date of Patent: Sep. 3, 2002

(54) MICRO-MACHINE POLARIZATION-STATE CONTROLLER

(75) Inventors: Nicholas J. Frigo, Red Bank; Evan L. Goldstein, Princeton; Lih-Yuan Lin, Little Silver; Chuan Pu, Middletown; Robert William Tkach, Little Silver, all of NJ (US)

(73) Assignee: AT&T Corp., New York, NY (US)

(*) Notice: Subject to any disclaimer, the term of this patent is extended or adjusted under 35 U.S.C. 154(b) by 1 day.

(21) Appl. No.: 09/754,622

(22) Filed: Jan. 4, 2001

Related U.S. Application Data

(60) Provisional application No. 60/177,297, filed on Jan. 21, 2000.

(51) Int. Cl.[7] .................................................. G02F 1/03
(52) U.S. Cl. ........................................................ 359/246
(58) Field of Search ............................... 359/122, 246, 359/237, 249, 254, 192, 499, 500, 224; 356/318, 336, 351, 367, 489; 250/201.1

(56) References Cited

U.S. PATENT DOCUMENTS

| | | | | |
|---|---|---|---|---|
| 4,799,796 A | * | 1/1989 | Musha | 356/336 |
| 5,793,485 A | * | 8/1998 | Gourley | 356/318 |
| 5,999,303 A | * | 12/1999 | Drake | 359/224 |
| 6,188,477 B1 | * | 2/2001 | Pu et al. | 356/351 |

* cited by examiner

*Primary Examiner*—Georgia Epps
*Assistant Examiner*—Gary W O'Neill

(57) ABSTRACT

Methods and systems for controlling the state of polarization of an optical beam using micro-machined devices are provided. By cascading a number of simple polarization state rotators integrated on a number of silicon substrates, the state of polarization of an optical beam can be effectively manipulated to any point on the Poincaré sphere.

31 Claims, 10 Drawing Sheets

MICRO-MACHINE POLARIZATION-STATE CONTROLLER

This nonprovisional application claims the benefit of the U.S. provisional application No. 60/177,297 entitled "Micromachined Polarization Mode Dispersion (PMD) Compensator" filed on Jan. 21, 2000. The Applicant of the provisional application is Lih-Yuan LIN. The above provisional application is hereby incorporated by reference including all references cited therein.

BACKGROUND OF THE INVENTION

1. Field of Invention

The invention relates to methods and systems that control the states of polarization of optical beams.

2. Description of Related Art

As optical fibers are becoming more and more ubiquitous in the optical communications industry, the effects of polarization mode dispersion (PMD) caused by subtle defects of optical fibers become increasingly important. Generally, PMD occurs when an optical signal propagates through a birefringent optical fiber causing various components of the optical signal to travel at varying velocities, thus causing multiple images of the optical signal to appear at a receiver.

To aid in compensating for signal distortion arising from PMD, polarization-state controllers have been provided within the industry that "adjust" the state of polarization of an optical signal. However, these conventional controllers suffer from several problems, such as being unwieldy in size or capability. Therefore, there is a need for new methods and systems to control the states of polarization of optical signals.

SUMMARY OF THE INVENTION

The invention provides methods and systems for micro-machined polarization-state controllers of optical signals. Particularly, the invention provides methods and systems relating to compact and versatile polarization-state controllers such that the state of polarization of an optical signal can be manipulated to any point on a Poincaré sphere diagram. These polarization-state controllers can be formed by cascading a number of simple polarization rotators and 45° rotators integrated on a number of silicon substrates. Each polarization rotator can split a received optical signal into its fast and slow components. The fast and slow components can then be controllably delayed relative to each other using one or more adjustable micro-machined micro-mirrors and then recombined to form a single adjusted optical signal, thus controllably rotating the polarization state of the received optical signal.

Other features and advantages of the present invention are described below and are apparent from the accompanying drawings and from the detailed description which follows.

BRIEF DESCRIPTION OF THE DRAWINGS

The invention is described with regard to the following figures, wherein like numbers reference like elements, and wherein.

DETAILED DESCRIPTION OF PREFERRED EMBODIMENTS

Optical fibers are ideally designed and manufactured to be perfectly cylindrical and have uniform properties throughout the length of the fibers. However, inconsistencies in manufacturing, laying, and environmental conditions can perturb the structure of an optical fiber to result in imperfect optical fibers having non-uniform, non-cylindrical contours such as a corkscrew-like or elliptical shape. As a result of these mechanical imperfections, an optical signal traversing such optical fibers can undergo a phenomenon commonly referred to as polarization mode dispersion (PMD).

To compensate for the deleterious effects of PMD, it is well understood in the optical transmission arts that PMD can be compensated at least in part by splitting the "fast-axis" component, or "image", of an optical signal from the "slow-axis" component, or image, temporally delaying the fast image relative to the slow-image and then merging the two images to form a single compensated image. By altering the state of polarization of an optical signal, the optical signal can be advantageously split into its constituent fast and slow images, thus providing for PMD compensation.

Unfortunately, conventional polarization-state controllers can be unwieldy in size, operation, complexity and performance, and implementing polarization-state controllers often requires a general tradeoff in consideration of these factors.

However, by applying micro-machine technology to various novel polarization compensation techniques, fast, compact and powerful micro-machined devices for controlling the state of polarization of an optical signal can be produced. Particularly, methods and micro-machined systems for moving the state of polarization of an optical signal to any point on a Poincaré sphere can be provided that can be applied to PMD compensation devices.

Figure 1:
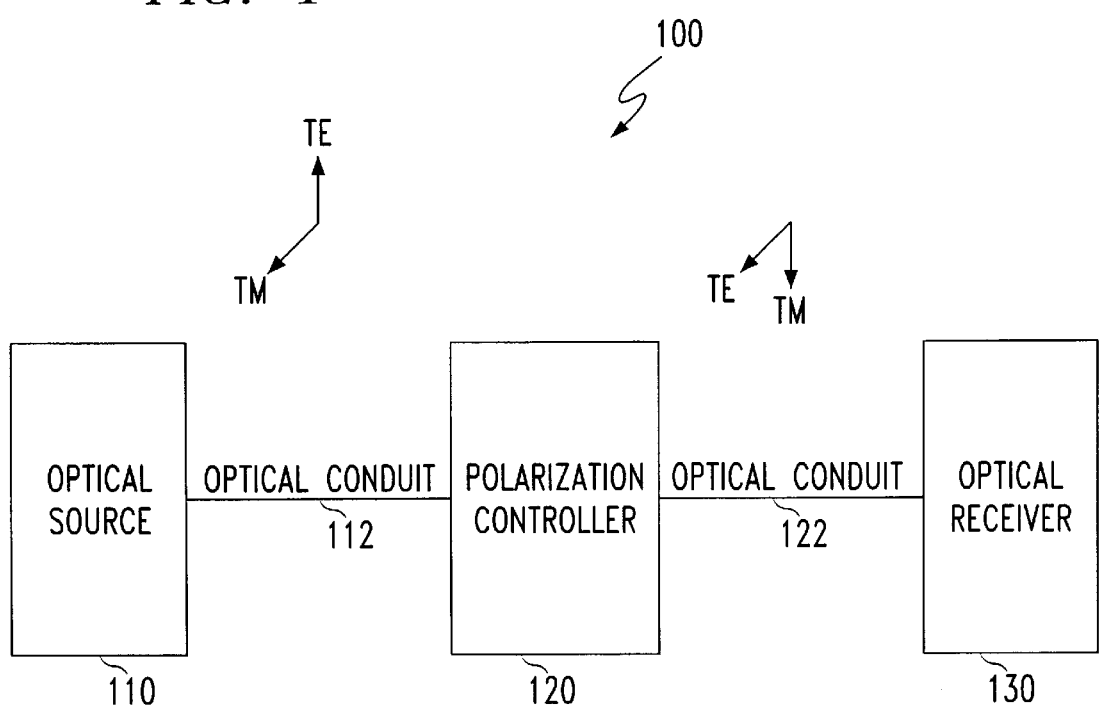
FIG. 1 is a block diagram of an exemplary optical transmission system containing a polarization-state controller.

FIG. 1 illustrates a block diagram of an exemplary optical transmission system 100. The system 100 includes an optical source 110, a polarization state controller 120 and an optical receiver 130. The polarization state controller 120 can receive one or more optical signals from the optical source 110 via a first optical conduit 112, adjust the states of polarization of the optical signals, and then provide the adjusted optical signal to the optical receiver 130 via a second optical conduit 122. The optical receiver 130 can also send commands, error conditions or other information to the polarization state controller 120, thus permitting variable adjustment of the effects of the polarization state controller 120 on the optical signal.

The optical source 110 can be any of a number of different types of optical sources, such as a computer with optical transceivers, or any other known or later developed combination of software and hardware capable of generating, relaying or recalling from storage any information capable of being transmitted in an optical signal. The optical receiver 130 can likewise be any one of a number of different types of optical receiving devices, such as computers with optical transceivers, or any other known or later developed combination of software and hardware capable of receiving, relaying or otherwise sensing any information capable of being received in an optical signal.

The optical conduits 112 and 122 can be any of a number of known or later developed optical transmission media, such as optical fibers, lenses, collimators, filters, free space, etc., that can support propagation of an optical signal. However, it should be understood that any transmission media that may support propagation of an optical signal or exhibit polarization dispersion effects on the optical signal may be considered an optical conduit without departing from the spirit and scope of the present invention.

Within the context of the following embodiments, it should be understood that a "polarization state controller" can be any device or system that can appreciably affect the state of polarization (SOP) of an optical signal, as expressed in Eq. (1), in a controllable manner:

$$|SOP\rangle = \cos(\theta/2) \cdot e^{-i\phi/2}|TE\rangle + \sin(\theta/2) \cdot e^{i\phi/2}|TM\rangle, \quad (1)$$

where TE is the transverse-electric mode, TM is the transverse-magnetic mode, $\phi$ is the phase-shift angle and $\theta/2$ is the angle of rotation of the field vector along the propagation-axis of an optical signal.

The SOP of an optical signal can be conveniently visualized as a single point on a graphical representation commonly referred to as a Poincaré sphere. Accordingly, a polarization state controller can be any device that can appreciably displace the SOP from one point on the Poincaré sphere to another point on the Poincaré sphere.

The SOP of an optical signal is uniquely determined by $\phi$ and $\theta$, therefore selectively changing either of the $\phi$ or $\theta$ angles in Eq. (1) is equivalent to controlling the state of polarization. Specifically, changing the phase difference $\phi$ is equivalent to "rotating" the SOP on a respective arc on the Poincaré sphere around the TE/TM axis, and a device that performs such a function can be called a "polarization rotator". The angle $\theta$ in Eq. (1) denotes the relative magnitude of the TE/TM component of the incident optical wave and can be changed by modifying the relative magnitude of the TE/TM component. This can be achieved, for example, by cascading several polarization rotating devices, as will be discussed later.

It should be appreciated that while a polarization rotator and a polarization controller can be distinctly different devices, both devices controllably alter the polarization state of an optical signal. Therefore, one of ordinary skill may interchangeably refer to any polarization altering device as a polarization rotator or a polarization controller, without departing from the spirit and scope of this invention.

Figure 2:
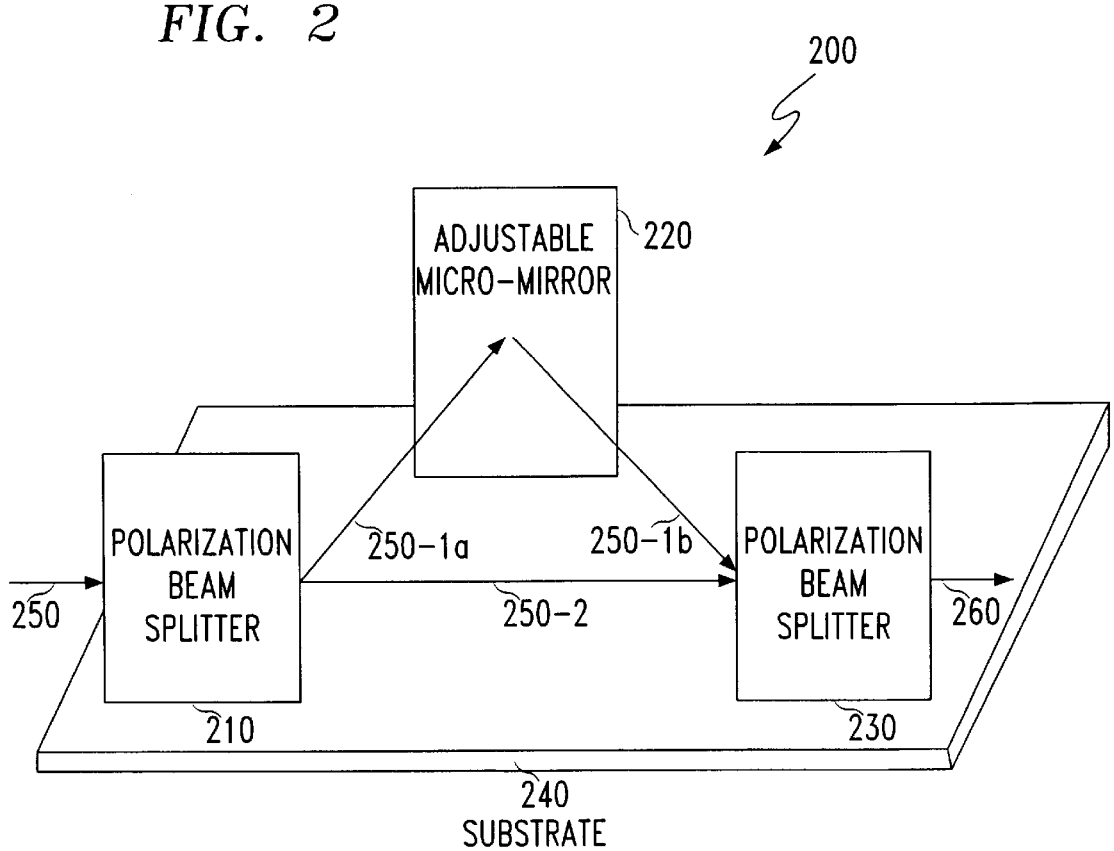
FIG. 2 illustrates a first exemplary embodiment of an adjustable polarization rotator.

FIG. 2 illustrates a first exemplary micro-machined polarization rotator 200 capable of controlling a phase shift of an optical signal. That is, the polarization rotator can affect the phase angle $\phi$ of an optical signal according to Eq. (1). The polarization rotator 200 is disposed over a substrate 240, and includes a first polarization-beam-splitter 210, a second polarization-beam-splitter 230 and an adjustable micro-mirror 220. Each of the exemplary polarization-beam-splitters (PBS) 210 and 230, as well as the exemplary adjustable micro-mirror 220, can be integrated on the substrate 240 and stand on the substrate 240 with the aid of established surface micro-machining technology.

The exemplary PBSs 210 and 230 are silicon plates oriented such that an optical beam will fall incident at the Brewster angle, which is 74° for silicon. The micro-mirror 220 is parallel to the PBSs 210 and 230 and is secured next to an electrode plate (not shown) by a mirror frame and torsion beams (also not shown). The adjustable micro-mirror can be translationally displaced by applying a voltage bias between the micro-mirror 220 and the electrode plate. Various micro-machined PBSs are described in detail in Pu, C. et al., "Surface micromachined integrated optical polarization beam splitter", *IEEE Photonics Technology Letters*, Vol. 10, No. 7, (1998) herein incorporated by reference in its entirety. Similarly, various voltage controlled micro-mirrors are described in detail in Comtois, J. H. et al., "Implementation of hexagonal micromirror arrays as phase-mostly spatial light modulators", *International Society for Optical Engineering (SPIE)*, Proceeding No. 2641, pp. 76–87, herein incorporated by reference in its entirety.

While the PBSs 210 and 230 and micro-mirror 220 are composed of silicon, it should be appreciated that the materials can vary as a design choice or as otherwise required. It should be further appreciated that the adjustable micro-mirror 220 and adjustment mechanism can also vary as a design choice or as otherwise required. Finally, while the exemplary polarization rotator 200 is manufactured using CHRONOS INTEGRATED MICROSYSTEMS'® MUMPs® process with precision side latches, any micro-machining technology capable of producing the general configuration of the polarization rotator 200 can be used without departing from the spirit and scope of the present invention.

In operation, the first polarization-beam-splitter 210, situated in the path of a received optical beam 250, splits the received optical beam 250 into a first split-beam 250-1*a* and a second split-beam 250-2. The adjustable micro-mirror 220, situated in the path of the first split-beam 250-1*a*, reflects the split-beam 250-1*a* to provide a reflected split-beam 250-1*b* to the second beam splitter 230, which combines the reflected split-beam 250-1*b* with the second split-beam 250-2 to form a phase-shifted optical signal 260.

By applying a voltage bias between the adjustable micro-mirror 220 and the electrode plate, the adjustable micro-mirror 220 is electro-mechanically displaced, thus changing the total path length of the first split-beam 250-1*a*/250-1*b*. By changing the path length of the first split-beam 250-1*a*/250-1*b* relative to the path length of the second split-beam 250-2, the phase angle $\phi$ of the combined optical signal 260 is affected. Accordingly, it should be appreciated that, as the path length of 250-1*a*/250-1*b* relative to the path length of the second split-beam 250-2 is varied from zero to a one wavelength difference, the SOP of the combined optical signal 260 moves in a full circuit of substantially constant latitude about the TE/TM-axis of a Poincaré sphere.

In a variant of the polarization rotator 200, the adjustable micro-mirror 220 moves as a hinged-lever moves. That is, the adjustable micro-mirror 220 not only affects the path length of the first split-beam 250-1*a*/250-1*b*, but also affects the angle to which the reflected split-beam 250-1*b* is reflected. Such a variant of the exemplary polarization rotator 200 affects the combined optical beam 260 by both adjusting the phase relationship between the split-beams 250-1a/250-1b and 250-2, and by further changing the intensity of split-beam 250-1b relative to split-beam 250-2. That is, the angular deflection of split-beam 250-1b causes part of the energy of split-beam 250-1b to be deflected from the second polarization-beam-splitter 230, and also causes changes of the light coupling efficiency into the receiver. The combined optical beam 260, while having a different overall intensity from the received optical beam due to the loss of energy, will nonetheless undergo a polarization rotation effect.

The effect on the SOP of the combined optical signal 260 using a hinged micro-mirror is that, instead of merely circling about a fixed latitude about the TE/TM-axis of a Poincaré sphere, the SOP effectively "spirals" about the Poincaré sphere as the path length of 250-1a/250-1b is varied.

Figure 3:
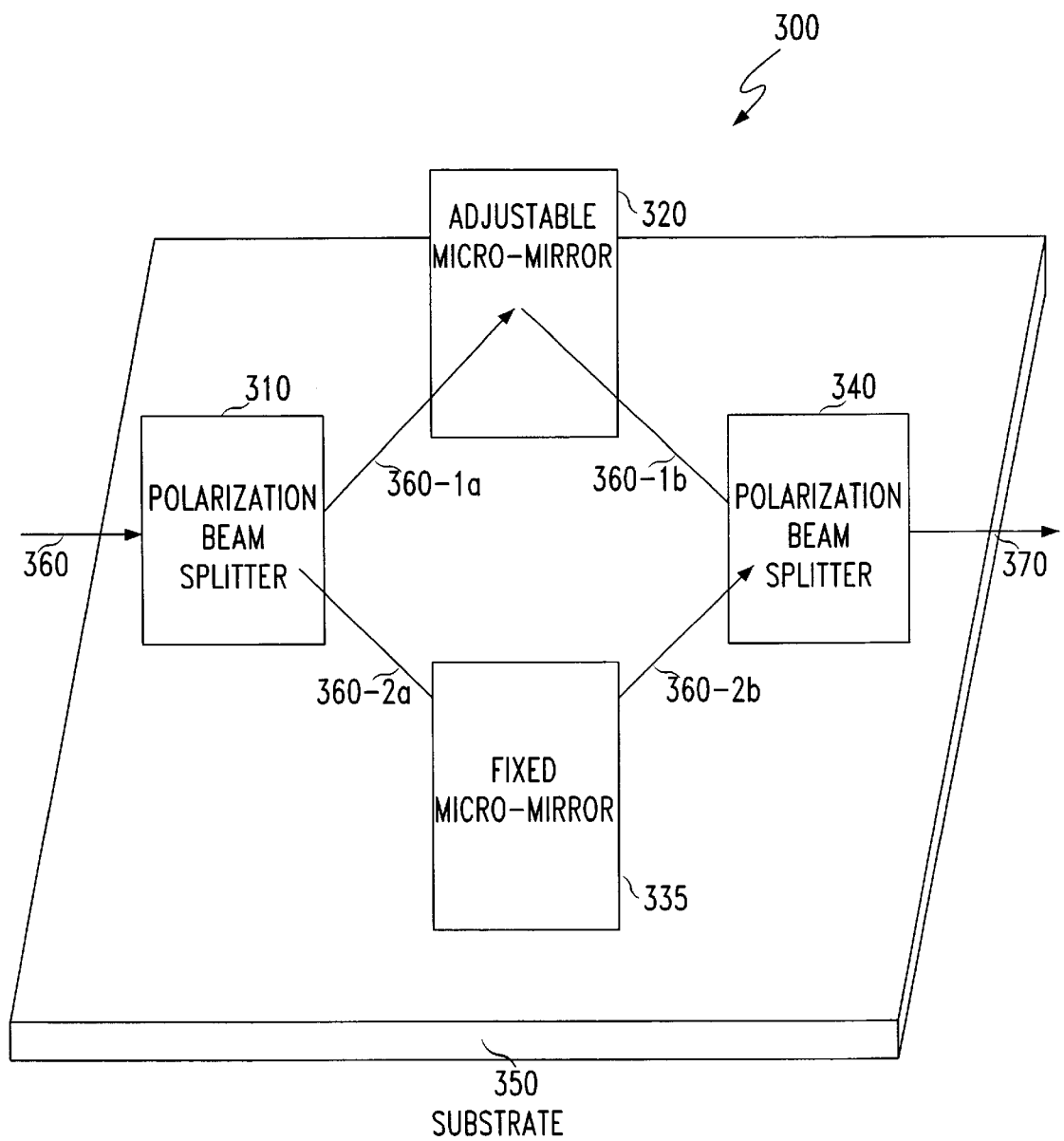
FIG. 3 illustrates a third exemplary embodiment of an adjustable polarization rotator.

FIG. 3 illustrates a second exemplary micro-machined polarization rotator 300. Like the device of FIG. 2, the polarization rotator 300 is situated on a substrate 350 and contains a first polarization-beam-splitter 310, a second polarization-beam-splitter 340 and an adjustable micro-mirror 320. However, in contrast to the embodiment of FIG. 2, a fixed micro-mirror 335 is situated in the optical path of the second split-beam 360-2a derived from a received optical beam 360 to provide a reflected second split-beam 360-2b to the second polarization-beam-splitter 340. Accordingly, the first and second reflected split-beams 360-1b and 360-2b can be combined by the second polarization-beam-splitter 340 to form a phase-shifted optical signal 370.

The fixed micro-mirror 335 facilitates alternate positioning of the polarization-beam-splitters 310 and 340 as well as the micro-machined phase-shifting micro-mirror 320. That is, the fixed micro-mirror 335 permits the optical paths of the split-beams to be of similar optical length, thus providing phase coherence. It should be further appreciated that the fixed micro-mirror 335 may be replaced with a second adjustable micro-mirror, similar to the adjustable micro-mirror 320, in order to provide an extra degree of control and that various adjustable micro-mirrors may be suitably placed before or after the polarization-beam-splitters 310 and 340 to provide varying degrees of optical path control. As with the device of FIG. 2, the polarization rotator 300 adjusts the state of polarization of an optical beam 360 by controllably altering the phase angle φ of the combined optical signal 370.

Figure 4:
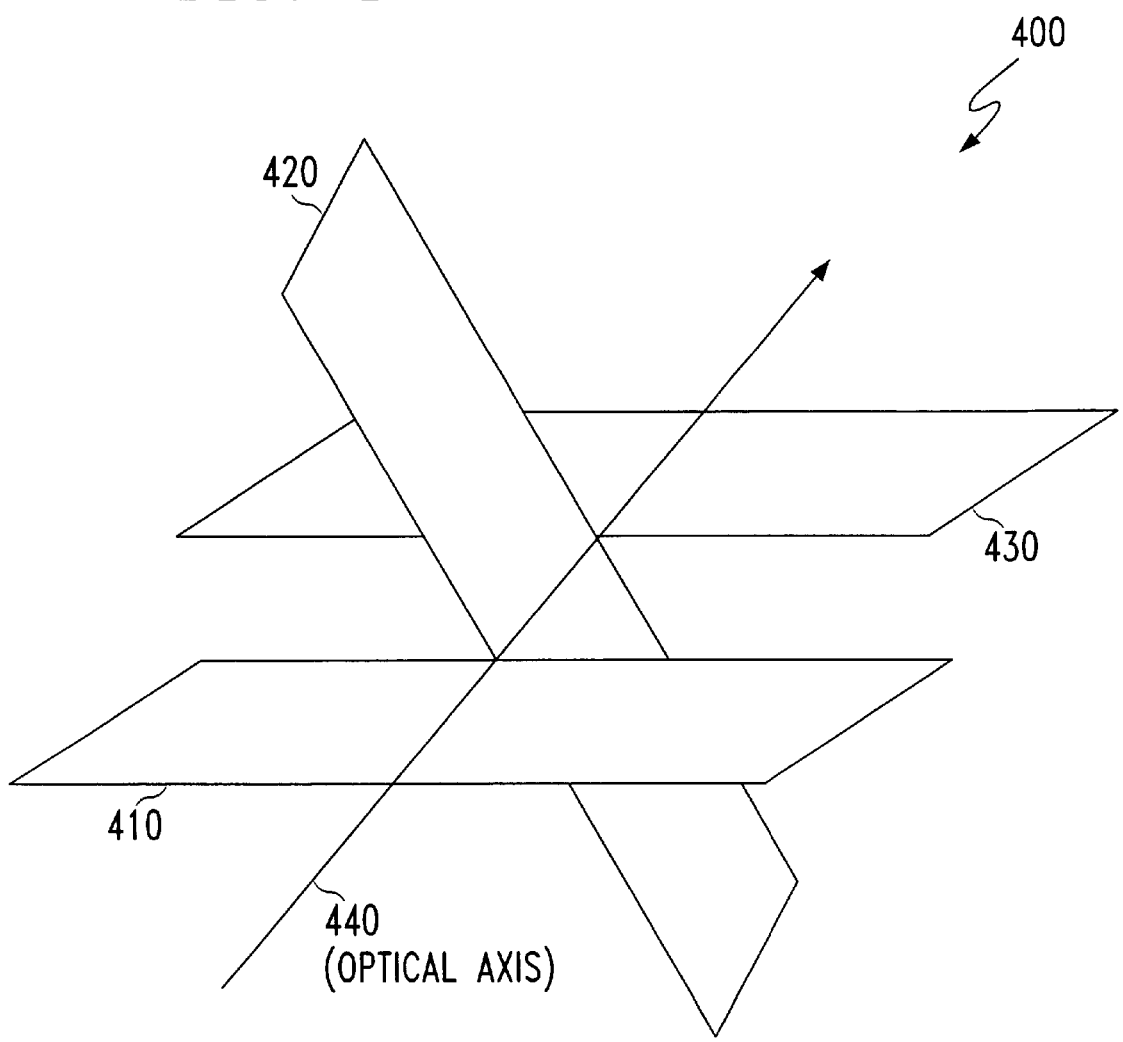
FIG. 4 is diagram depicting three cascaded polarization rotators oriented 45° from each other.

FIG. 4 illustrates a diagram of an exemplary cascaded polarization-state controller 400 composed of a series of three phase-shifting polarization rotators 410, 420 and 430, aligned along the path of an optical-axis 440 of an optical signal.

Each of the exemplary phase-controlling polarization rotators 410, 420 and 430 are configured to control the SOP in manners consistent with the devices of FIGS. 2–3. However, it should be appreciated that the particular configuration of each of the rotators 410, 420 and/or 430 is a design choice and can accordingly vary without departing from the spirit and scope of the present invention.

The three polarization rotators 410, 420, 430 are rotated around the optical path 440 by 45° with respect to each other. These three rotators 410, 420 and 430 can be monolithically integrated on a single substrate, or the rotators 410, 420 and 430 can be discrete devices packaged together. Since each of polarization rotating stages are consecutively rotated about the optical-axis by 45°, each stage pair constitutes a ninety-degree (90°) shift about the vertical-axis of a Poincaré sphere, thereby allowing an initial state of polarization to be moved to any point on the Poincaré sphere along three consecutive paths, with the second path being substantially perpendicular to the first and second paths.

Figure 5:
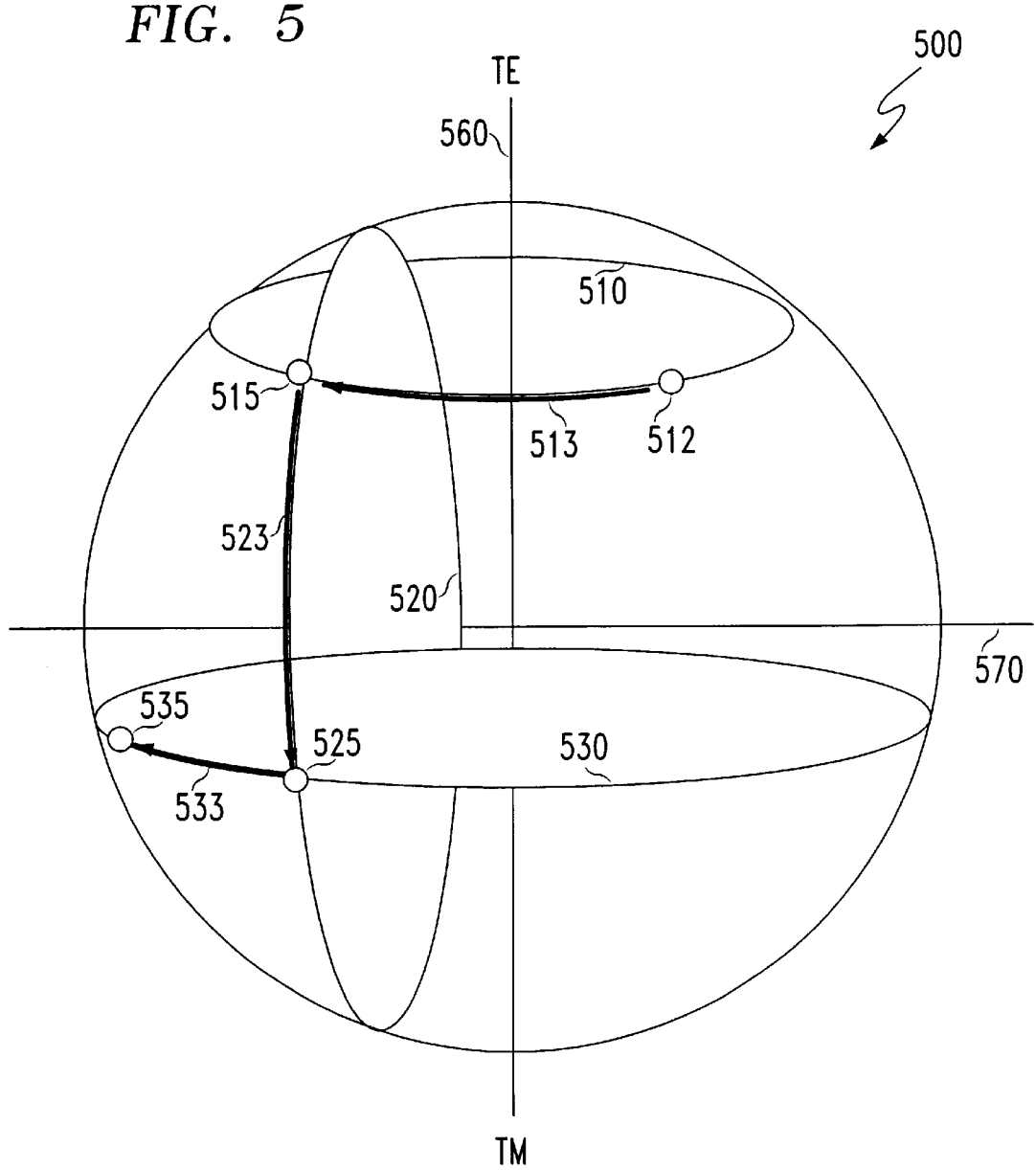
FIG. 5 illustrates a Poincaré sphere denoted with paths of states of polarization according to an exemplary embodiment of FIG. 4.

FIG. 5 illustrates the exemplary polarization stage paths 513, 523 and 533 on a Poincaré sphere 500 having a North-South axis 560 and an East-West axis 570 according to the cascaded polarization state controllers of FIG. 4. As discussed above, the Poincaré sphere 500 is a graphical representation of the SOP of an electromagnetic wave/optical beam, where the SOP of a particular optical signal can be conveniently represented as a single point on the Poincaré sphere 500. The states of polarization on the North and South poles represent states of polarization corresponding to the transverse electric (TE) and transverse-magnetic (TM) states of polarization of an optical beam, respectively. It can be appreciated, from FIG. 4 and the Poincaré sphere, that a 45° rotation of the optical-axis (i.e., a 45° rotation in the axis of propagation of a TE wave in physical space), translates to a 90° rotation about the Poincaré sphere's polarization-axes. Thus, a state of polarization on the "North" pole on the North-South axis 560 will be principally rotated to a point on the equator's "West" pole on the East-West axis 570. The West and East poles on the East-West-axis 570, respectively, represent linear polarizations of an optical signal ±45° relative to the original TE. Accordingly, a 90° rotation in the axis of propagation of a TE wave is a TM wave, which is represented on the Poincaré system as a 180° reversal of the North-pole and South-pole positions, and where other angular states of polarization off the major-axes represent varying elliptical polarization states.

Regarding the state of polarization paths according to the embodiment of FIG. 4, as illustrated in FIG. 5, the first-stage polarization rotator 410 may phase shift a received optical signal's state of polarization 512 on a first polarization path 513 along a first latitude 510 on the Poincaré sphere 500 to arrive at a state of polarization 515. Next, since the first-stage 410 and second-stage 420 polarization rotators of FIG. 4 are oriented 45° relative to each other, the domain of the state of polarization 515 is now constrained to a second orientation of 520. Therefore, operation of the second-stage 420 rotator may phase shift the state of polarization 515 of the optical signal on along a polarization path 523 to arrive at the state of polarization 525. Then, since the third-stage polarization rotator 430 also is 45° rotated, the state of polarization 525 is then constrained to a second latitude 530 which is substantially parallel to the first latitude 510. The third-stage controller 430 of FIG. 4 can then phase shift the optical signal's state of polarization 525 along a third polarization path 533 to arrive at the final state of polarization 535. Accordingly, the SOP of any optical signal can be controllably changed from any first point on the Poincaré sphere 500 to any other point on the Poincaré sphere 500.

Although FIG. 5 illustrates the polarization paths as traversing only perpendicular paths, it should be appreciated that it is possible to configure paths that are not mutually orthogonal. That is, instead of configuring the various polarization state controllers 410, 420 and 430 at 45° angles relative to each other to effectively rotate the paths on the Poincaré sphere by 90°, the polarization rotators can be fixed at lesser or greater angles to effectively rotate paths on the Poincaré sphere at any angle. Moreover, it should be appreciated that the polarization rotators 410, 420 and 430 can be cascaded at controllably variable angles relative to each other. Also, a polarization state controller can be configured with less or more than three cascaded polarization rotators to provide variable degrees of SOP control.

Figure 6:
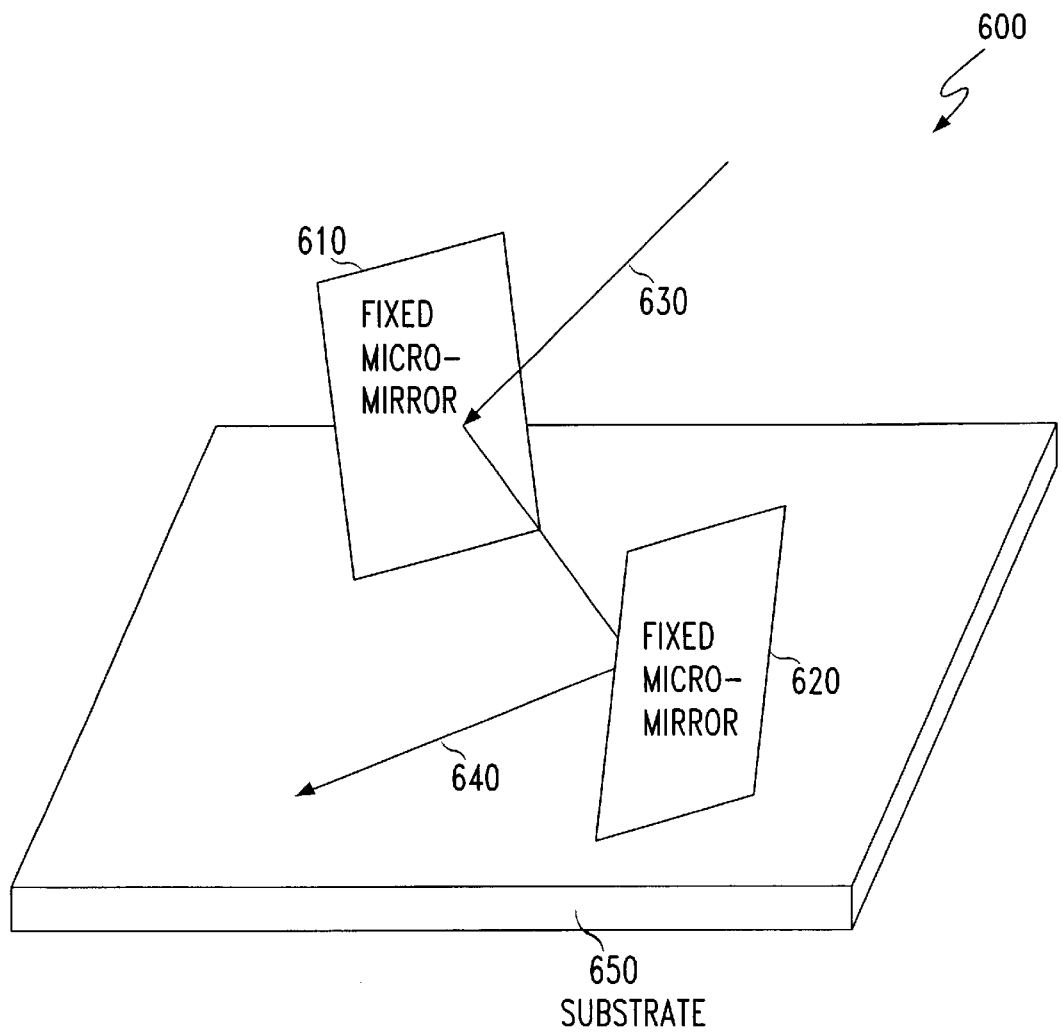
FIG. 6 illustrates an exemplary embodiment of a 45 degree rotator.

FIG. 6 illustrates an exemplary micro-machined 45° polarization rotator 600 situated on a substrate 650. The 45° polarization rotator 600 includes two fixed micro-mirrors 610 and 620 appropriately aligned to provide a 45° rotation of the input polarization about the optical-axis. The rotation angle of the 45° rotator 600 is dependent on the alignment angles of the micro-mirrors 610 and 620 and the corresponding angles of incidence and reflection. However, it should be recognized that, although the exemplary polarization rotator 600 performs a 45° rotation, the polarization rotator 600 can achieve any polarization rotation angle geometrically feasible by proper alignment of the fixed micro-mirrors 610 and 620, to effect an appropriate manipulation of the incident and reflecting angles.

Figure 7:
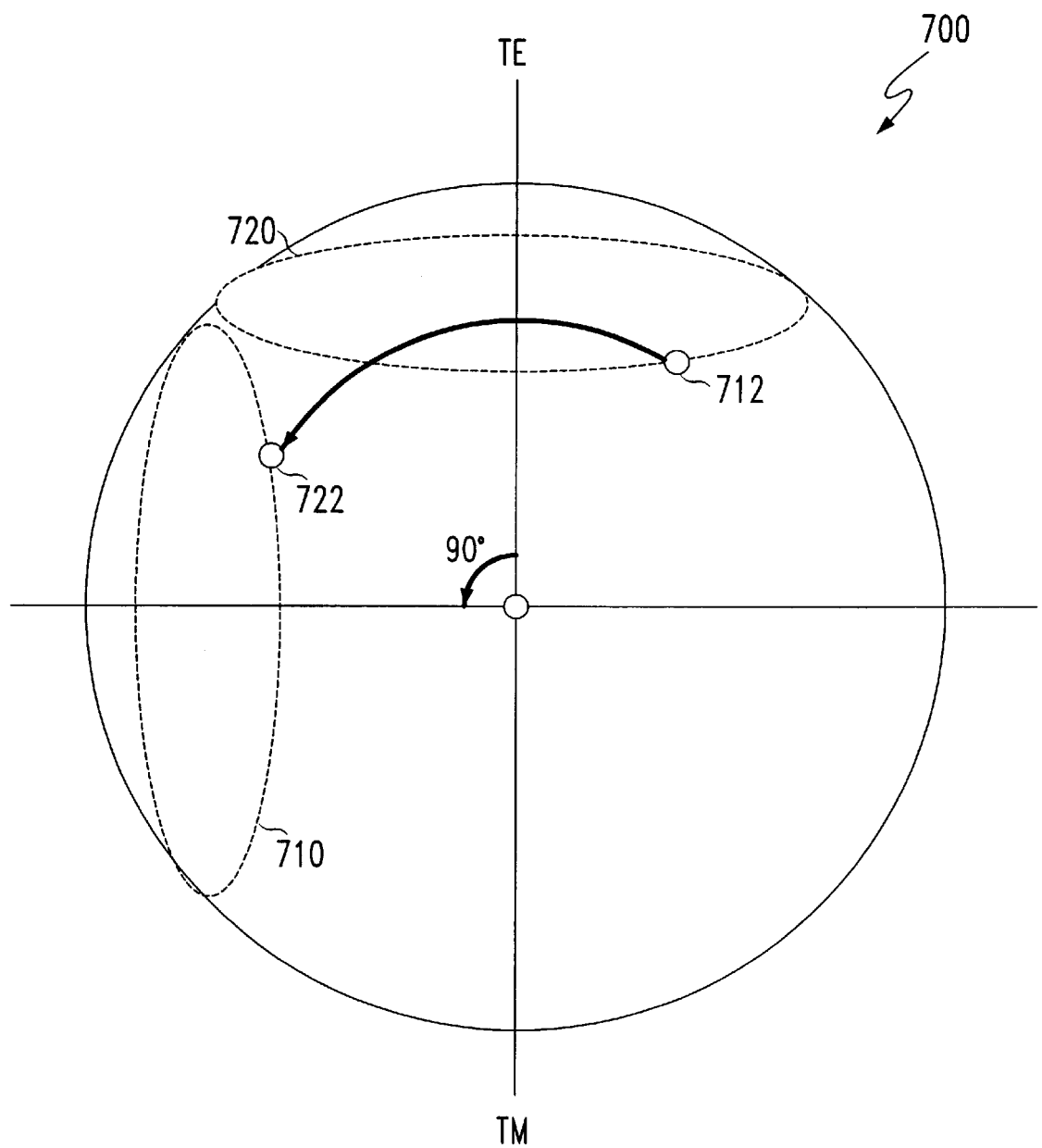
FIG. 7 illustrates a Poincaré sphere denoted with paths of states of polarization according to an exemplary embodiment of FIG. 6.

FIG. 7 illustrates the rotation of a state of polarization on a Poincaré sphere using the device of FIG. 6. As discussed above, the 45° polarization rotator of FIG. 5 provides a 45° polarization rotation of the input optical signal, which on a Poincaré sphere is a 90° rotation of the SOP. The 45° polarization rotation accordingly will rotate any state of polarization such as the state of polarization 712 to a second state of polarization 722. For illustrative purposes, two polarization paths 710 and 720 are provided to indicate the rotated domains affected by a 45° rotator.

Figure 8:
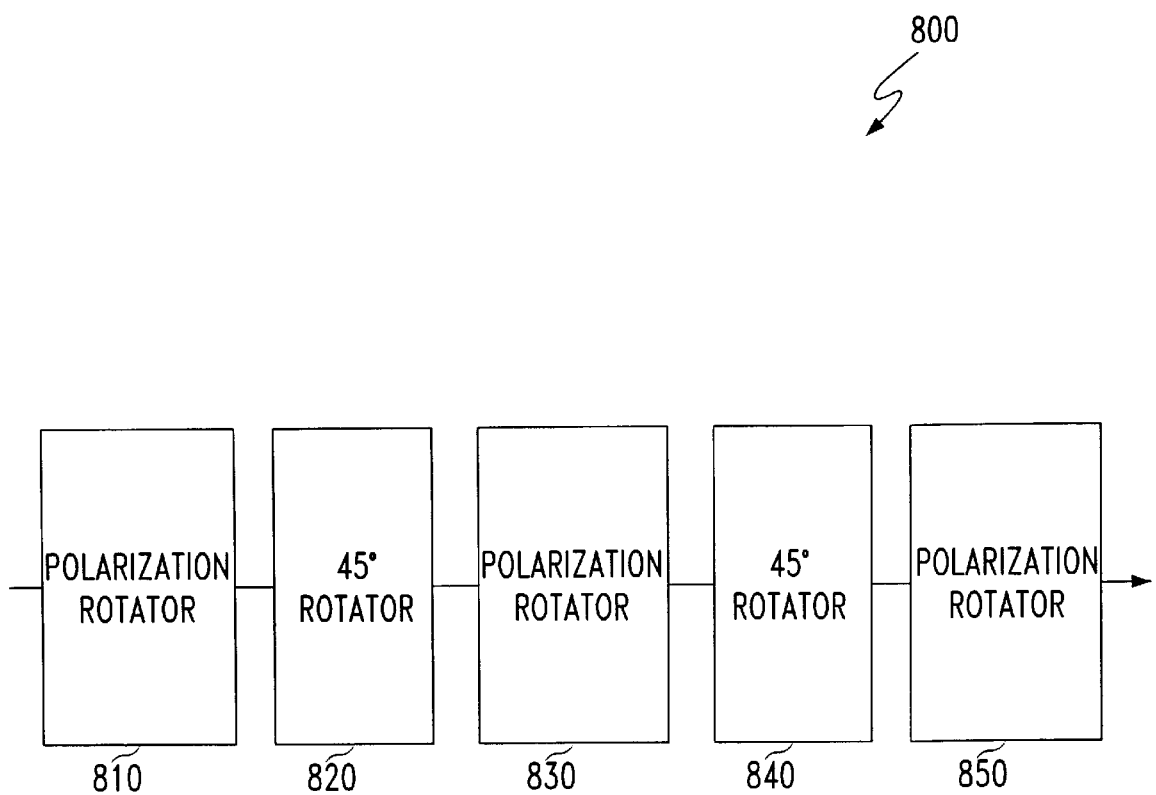
FIG. 8 is a block diagram of an exemplary versatile polarization-state controller containing the various devices of FIGS. 2, 3, 5 and 7.

FIG. 8 illustrates a block diagram of an exemplary polarization controlling system 800 wherein two 45° rotators 820 and 840 are interleaved between three polarization rotators 810, 830 and 850. In operation, an optical beam traverses the first polarization rotator 810 where the phase angle of the optical beam is controllably adjusted. The adjusted optical beam is then fed to the first 45° rotator 820, which effectively rotates the optical beam's SOP on the Poincaré sphere by 90°, and the rotated optical beam is fed to the second polarization rotator 830. The second polarization rotator 830 receives the rotated optical beam and adjusts the phase angle of the rotated optical beam in a substantially orthogonal direction from the adjustment performed by the first polarization rotator 810. The second polarization rotator 830 then feeds the adjusted optical beam to the second 45° rotator, which again rotates the optical beam's SOP on the Poincaré sphere by 90° and the rotated optical beam is then fed to the third polarization rotator 850, which performs a third phase adjustment on the optical beam in a direction substantially orthogonal from the adjustment performed in the second polarization rotator 830.

Figure 9:
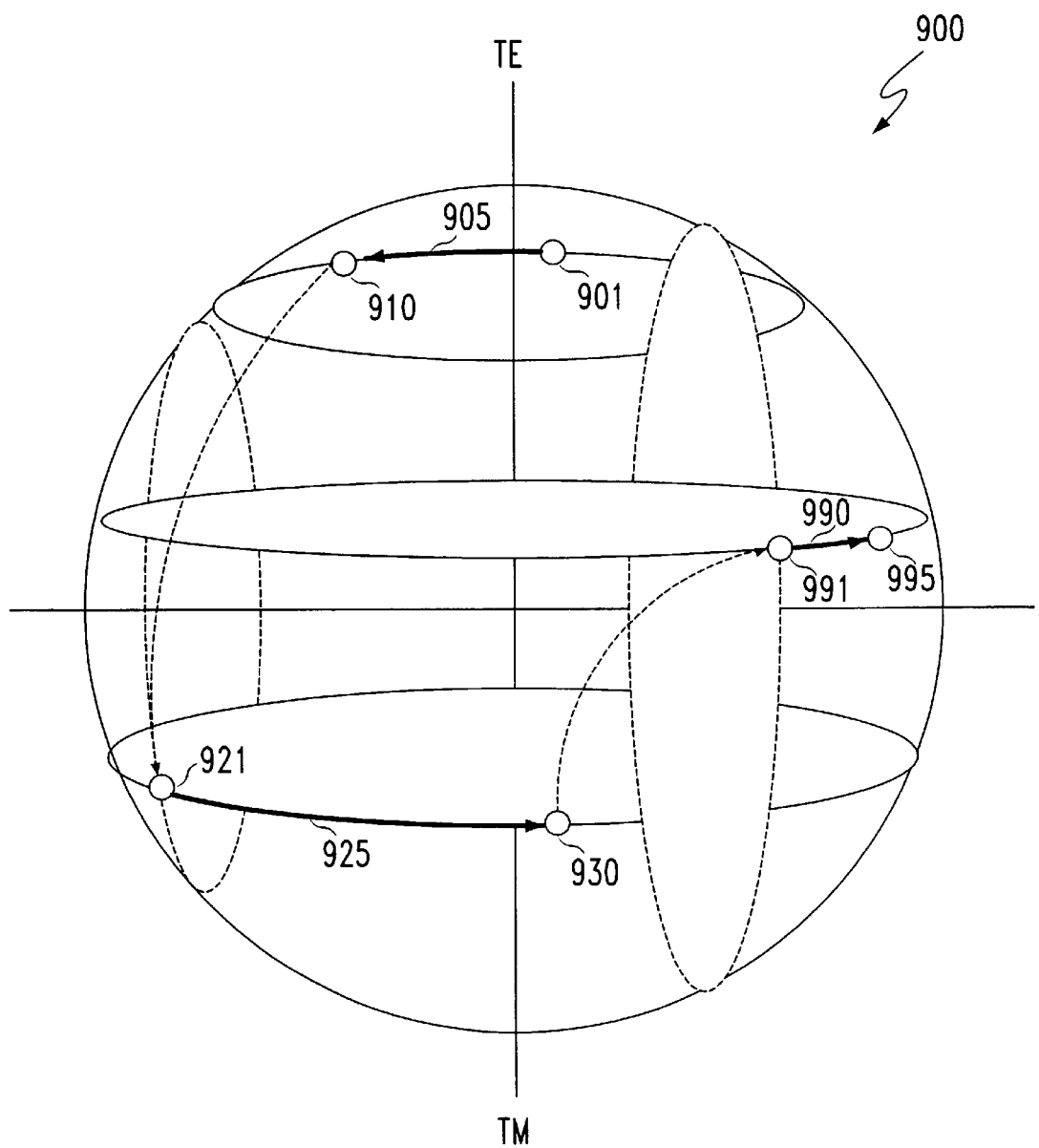
FIG. 9 illustrates a Poincaré sphere denoted with the state of polarization paths according to an exemplary embodiment of FIG. 8.

FIG. 9 illustrates an exemplary state of polarization path transition on the Poincaré sphere using the device of FIG. 8. As shown in FIG. 9, an initial state of polarization 901 may be phase-shifted to state of polarization 910 along path 905 by the first polarization rotator 810 of FIG. 8. The state of polarization 910 may be rotated to state of polarization 921 by the first 45° rotator 820. The state of polarization 921 is then phase-shifted to state of polarization 930 along path 925 by the second polarization rotator 830. Next, the state of polarization 930 is rotated to state of polarization 991 by the second 45° rotator 840. Finally, the state of polarization 991 is phase-shifted to a final state of polarization 995 along path 990 by the third polarization rotator 850. Accordingly, by using the exemplary polarization controlling device of FIG. 8, a state of polarization can be moved to any two points on the Poincaré sphere.

Figure 10:
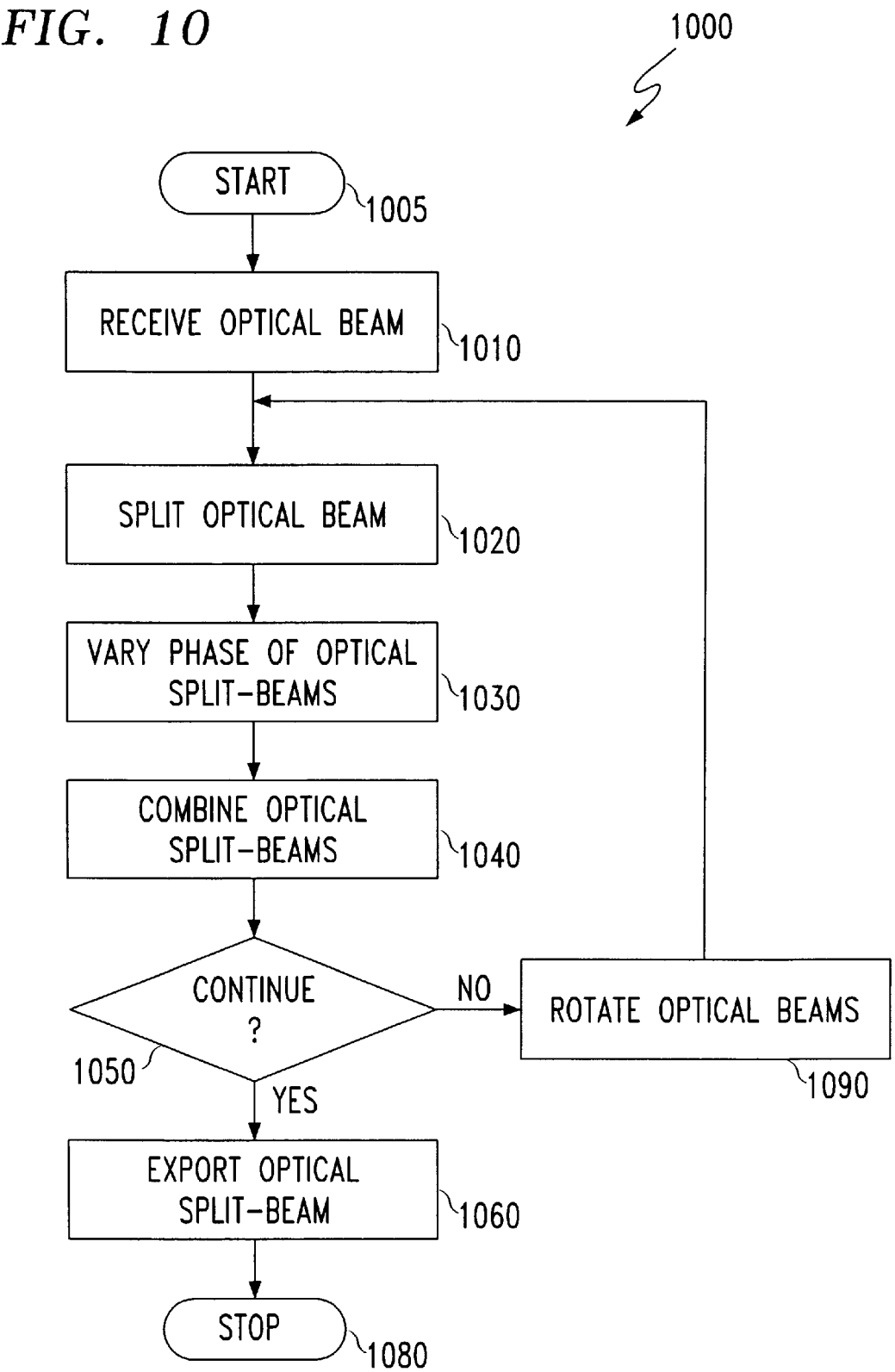
FIG. 10 is a flow chart outlining an exemplary technique for adjusting the state of polarization of an optical signal according to various exemplary embodiments of the present invention.

FIG. 10 is a flow chart outlining an exemplary technique for adjusting the state of polarization of an optical signal according to various exemplary embodiments of the present invention. The process starts in step 1005 where an optical beam is received in step 1010. Then, in step 1020, the optical beam is split into its constituent beams. While the exemplary technique uses a micro-machined polarization-beam-splitter made of silicon that is affixed to a single substrate, it should be appreciated that any known or later developed technique useful to split an optical beam into its constituent components can be used without departing from the spirit and scope of the present invention. The process continues to step 1030.

In step 1030, one or both of the path lengths of the optical split-beams are varied such that the path lengths of the optical split-beams are varied relative to each other. While the exemplary technique uses one or more adjustable micro-machined micro-mirrors affixed to a substrate controlled using an electrode plate and torsion beams, it should be appreciated that any known or later developed technique useful to vary the path length of an optical beam relative to another optical beam can be used without departing from the spirit and scope of the present invention. The process continues to step 1040.

In step 1040, the optical split-beams are recombined. The exemplary technique uses a polarization-beam-splitter similar to that used in step 1020 to combine the optical split-beams. However, as with step 1020, it should be appreciated that any known or later developed technique useful to combine optical beams can be used without departing from the spirit and scope of the present invention.

As discussed above, it should be appreciated that steps 1020, 1030 and 1040 can together phase-shift the state of an optical beam. However, it should be appreciated that any other known or later developed combination of various steps useful to affect the phase-angle φ of the state of polarization of an optical beam can be used without departing from the spirit and scope of the present invention. The process continues to step 1050.

In step 1050, a determination is made to further affect the state of polarization of the optical beam. If the state of polarization of the optical beam is to be further affected, control jumps to step 1090; otherwise, control continues to step 1060. In step 1060, the optical beam is exported and the operation stops in step 1080.

In step 1090, the optical beam is rotated. In various exemplary embodiments, the state of polarization of an optical beam is rotated using a number of fixed micro-mirrors capable of rotating an optical beam at a fixed angle. In various other exemplary embodiments, the optical beam can be rotated using at least one or more adjustable micro-mirrors capable of adjustably affecting the angle θ of an optical beam according to Eq. (1). In still other exemplary embodiments, the state of polarization of an optical beam is rotated by cascading several polarization rotators oriented at certain degrees, e.g., 45°, relative to each other as with the device of FIG. 4.

While the exemplary techniques are directed to rotating the state of polarization of an optical beam to a 90° angle relative to a Poincaré sphere, it should be appreciated that any useful or desirable rotation angle can be implemented without departing from the spirit and scope of the present invention.

It should be further appreciated that any other technique useful for rotating the state of polarization, such as Faraday rotators, or any other known or later developed combination of processes can be used without departing from the spirit and scope of the present invention.

After the optical beam is rotated, control then jumps back to step 1020 where steps 1020–1050 are repeated as desired.

It should be understood that each of the components shown in the various figures can be implemented as portions of a larger suitably structured device. Alternatively, each of the components shown in the various figures be implemented as physically distinct components or discrete elements. Furthermore, various components of the polarization controllers can be rearranged and combined with various other devices without departing from the spirit and scope of the present invention. Still further, the various devices of FIGS. 1–8 can be further combined with devices on the same or additional substrates without departing from the spirit and scope of the present invention. It should be understood that any combination of hardware and software capable of implementing the systems of FIGS. 1–9 or the flowchart of FIG. 10 can be used without departing from the spirit and scope of the present invention.

While this invention has been described in conjunction with specific embodiments thereof, it is evident that many alternates, modifications, and variations will be apparent to those skilled in the art. It is similarly understood that optical components and circuits shown in the above figures can be implemented as distinct optical devices or fabricated as a single unit. Accordingly, preferred embodiments of the invention as set forth herein are intended to be illustrative and not limiting. Thus, there are changes that may be made without departing from the spirit and scope of the invention.

What is claimed is:

1. A method for controlling a state of polarization of an optical beam, comprising:
    receiving the optical beam;
    splitting the received optical beam into at least a first split-beam and a second split-beam;
    varying a first path length of the first split-beam relative to a second path length of the second split-beam using a first substrate;
    combining the varied first split-beam with the second split-beam to form a first phase-shifted optical beam;
    first rotating the first phase-shifted optical beam to form a first rotated optical beam based on a first angle between the first substrate and the second substrate; and
    phase-shifting the first rotated optical beam using the second substrate to form a second phase-shifted optical beam.

2. The method of claim 1, at least one of splitting, varying, combining and phase-shifting being performed on the first substrate by the one or more first micro-machined devices.

3. The method of claim 1, the phase-shifting the first rotated optical beam being performed using the second substrate by one or more second micro-machined devices.

4. The method of claim 1, further comprising second rotating the second phase-shifted optical beam to form a second rotated optical beam.

5. The method of claim 4, further comprising third phase-shifting the second rotated optical beam, wherein third phase-shifting is performed using a third substrate by one or more third micro-machined devices.

6. The method of claim 1, wherein the step of first rotating is performed using one or more micro-machined micro-mirrors.

7. The method of claim 6, wherein at least one of the one or more micro-machined micro-mirrors is an adjustable micro-machined mirror.

8. The method of claim 1, wherein the first angle between the first and second substrate is 45°.

9. The method of claim 1, wherein the first and second substrate are the same substrate.

10. The method of claim 5, wherein the first, second and third substrate are the same substrate.

11. An apparatus for controlling a state of polarization of an optical beam, comprising:
    a first substrate;
    a first path length varying device that varies a first path length of the optical beam to selectively change the state of polarization of the optical beam, the first path length varying device including at least an adjustable micro-machined mirror mounted on the first substrate;
    a second substrate;
    a second path length varying device that includes at least an adjustable micro-machined mirror mounted on the second substrate, wherein the first substrate and the second substrate are fixed at a relative angle to perform a rotation of the state of polarization.

12. The apparatus of claim 11, wherein the first path length varying device includes at least a first beam-splitter that splits the optical beam into a first split-beam and a second split-beam, an adjustable mirror that controllably varies a path length of the first split-beam;
    wherein the first path length varying includes varying the first path length of the first split-beam relative to a second path length of the second split-beam.

13. The apparatus of claim 12, further comprising:
    a second beam-splitter that combines the varied first split-beam and the second split-beam to form a first path length varied optical beam;
    wherein at least one of the first beam-splitter, the adjustable mirror, and the second beam-splitter is a micro-machined device situated on a first substrate.

14. The apparatus of claim 13, wherein the first path length varying device performs a first phase-shifting operation on the optical beam to form a first phase-shifted optical beam.

15. The apparatus of claim 14, further comprising a first rotating device that first rotates the first phase-shifted optical beam to form a first rotated optical beam.

16. The apparatus of claim 14, wherein the first rotating device includes at least a first rotating micro-machined micro-mirror.

17. The apparatus of claim 16, wherein the first rotating micro-machined micro-mirror is adjustable.

18. The apparatus of claim 15, wherein the first rotating device includes at least two fixed micro-machined micro-mirrors.

19. The apparatus of claim 15, wherein the first rotating device is affixed to the first substrate.

20. The apparatus of claim 14, further comprising a second phase-shifting device that second phase-shifts the first rotated optical beam, wherein the second phase-shifting device is situated on a second substrate and includes one or more second micro-machined devices.

21. The apparatus of claim 20, further comprising a second rotating device that second rotates the second phase-shifted optical beam to form a second rotated optical beam.

22. The apparatus of claim 21, further comprising a third phase-shifting device that third phase-shifts the second rotated optical beam, wherein the third phase-shifting device is situated on a third substrate and includes one or more third micro-machined devices.

23. The apparatus of claim 11, wherein the second path length varying device is a phase-shifting device that second phase-shifts the optical beam.

24. The apparatus of claim 11, wherein the first substrate and the second substrate are the same substrate.

25. The apparatus of claim 11, wherein the relative angle is 45°.

26. The apparatus of claim 11, further comprising a third path length varying device that comprises at least an adjustable micro-machined mirror situated on a third substrate.

27. The apparatus of claim 26, wherein the third path length varying device is a phase-shifting device that third phase-shifts the optical beam.

28. The apparatus of claim 26, wherein the third path length varying wherein the third phase-shifting device is situated on a third substrate and includes one or more third micro-machined devices.

29. The apparatus of claim 26, wherein the first substrate, the second substrate and the third substrate are the same substrate.

30. The apparatus of claim 14, wherein the first phase-shifting device further includes at least a second mirror that reflects the second split-beam to the second beam-splitter.

31. The apparatus of claim 30, wherein the second mirror is situated such that the first path length of the first split-beam and the second path length of the second split-beam are substantially the same length.

* * * * *